United States Patent
Bondioli

(10) Patent No.: US 7,033,278 B2
(45) Date of Patent: Apr. 25, 2006

(54) WIDE-ANGLE CONSTANT-VELOCITY JOINT

(76) Inventor: Edi Bondioli, Via Gina Bianchi, 18-46029 Suzzara, Mantova (IT)

( * ) Notice: Subject to any disclaimer, the term of this patent is extended or adjusted under 35 U.S.C. 154(b) by 1 day.

(21) Appl. No.: 10/748,608

(22) Filed: Dec. 30, 2003

(65) Prior Publication Data

US 2004/0152525 A1  Aug. 5, 2004

(30) Foreign Application Priority Data

Jan. 3, 2003  (IT)  ............... FI2003A0001

(51) Int. Cl.
*F16D 3/32* (2006.01)
(52) U.S. Cl. ...................... 464/118; 464/905
(58) Field of Classification Search .............. 464/11, 464/113, 114, 117, 118, 905
See application file for complete search history.

(56) References Cited

U.S. PATENT DOCUMENTS

| | | | |
|---|---|---|---|
| 3,429,144 A * | 2/1969 | McIntosh | ............. 464/118 |
| 4,257,243 A * | 3/1981 | Herchenbach | ........ 464/118 |
| 4,490,125 A | 12/1984 | Konrad et al. | |
| 4,799,817 A | 1/1989 | Geisthoff | |
| 5,419,740 A * | 5/1995 | Koyari et al. | ........ 464/118 |
| 6,719,636 B1 | 4/2004 | Herchenbach et al. | |
| 2002/0187840 A1 | 12/2002 | Herchenbach et al. | |
| 2002/0189914 A1* | 12/2002 | Naples et al. | |
| 2004/0077411 A1* | 4/2004 | Dupuie et al. | ........ 464/118 |
| 2004/0152524 A1* | 8/2004 | Bondioli | ........ 464/118 |

FOREIGN PATENT DOCUMENTS

| | | |
|---|---|---|
| EP | 1 253 338 A1 | 10/2002 |
| EP | 1 435 466 A2 * | 2/2004 |
| GB | 894806 | 4/1962 |

* cited by examiner

*Primary Examiner*—Greg Binda
(74) *Attorney, Agent, or Firm*—McGlew & Tuttle, PC

(57) ABSTRACT

The joint comprises two spiders 18 and a central core 16 forming a housing 24 for the sliding movement—in a transverse plane—of a basically discoidal constraint member 20 forming the seats 20A for the spherical end heads 1 OC, 14C of the two forks. The constraint member 20 moves about inside the housing 24. Between each of the two surfaces 24A, 24B and the opposing face of the constraint member 20, an elastic laminar ring 40 shaped like a Belleville washer is interposed, its annular edges being in continuous annular contact with the surface 24A or 24B and with the opposing face of the constraint member 20.

5 Claims, 4 Drawing Sheets

WIDE-ANGLE CONSTANT-VELOCITY JOINT

CROSS REFERENCE TO RELATED APPLICATIONS

This application claims the benefit of priority under 35 U.S.C. § 119 of Italian Application FI2003 A 000001 filed Jan. 3, 2003.

FIELD OF THE INVENTION

The invention relates to a constant velocity joint—especially for wide-angle applications—which is improved in order to achieve the objects of: extending the life of the grease lubrication of the joint and hence increasing the time between one injection and the next; and minimizing the loss of lubricating grease.

These and other objects and advantages will become clear from the text which follows.

BACKGROUND OF THE INVENTION

The constant-velocity joint is of a conventional type that comprises two forks forming input and output members of the joint, two spiders, and a central core forming a housing for sliding movement—in a transverse plane—for at least one basically discoidal constraint member that forms the seats for the spherical end heads of the two forks; said constraint member moves about in a transverse plane of symmetry of the central core, to which two surfaces of said housing are parallel. Frequently between each of said two surfaces and the opposing face of said constraint member a laminar ring is interposed, resulting in continuous annular contact with said surface and with said opposing face of the constraint member. This is done in an effort to reduce the loss of lubricating grease, which is mostly there to lubricate between the spherical heads and their seats.

SUMMARY OF THE INVENTION

To maintain the functionality of said laminar rings, according to the invention said laminar rings are of an elastic material and shaped as Belleville washers (diaphragm springs), in which the outer edge bears and presses continuously on said surface and the inner edge bears and presses continuously against the opposing face of the constraint member. Advantageously, both of said laminar rings are of an elastic metal and shaped as Belleville washers, in order to press as stated above.

A clearer understanding of the invention will be gained from the description and attached drawing, the latter showing a practical nonrestrictive example of the invention.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
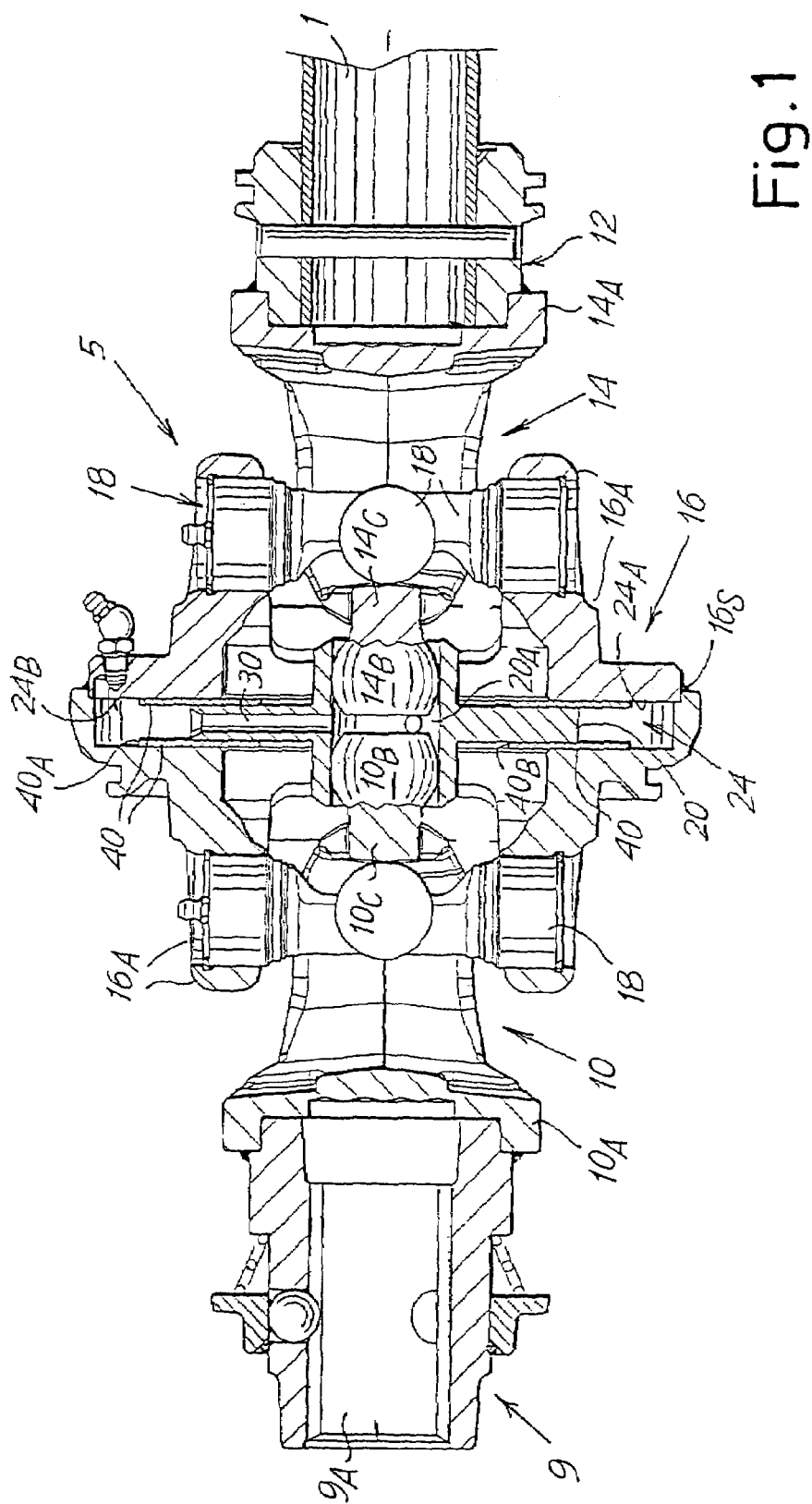
FIGS. 1 and 2 show a constant-velocity joint in longitudinal section, in two positions which it is capable of assuming.

Referring to the drawings in particular, the appended drawing (FIGS. 1 and 2) illustrates a wide-angle constant-velocity joint. Reference 1 denotes a tubular component of a telescopic shaft, which ends in a wide-angle constant-velocity joint 5. The telescopic shaft 1 may be fitted with a protective sheath. The constant-velocity joint 5, which is of the wide-angle type, comprises a power coupling member 9, for the input or output of the joint, which forms a splined seat 9A for connection to a drive member with which the constant-velocity joint is combined. The member 9 is integral with the base 10A of a fork 10 forming part of the said joint 5. The telescopic shaft 1 is engaged on a member 12 integral with the base 14A of a fork 14 belonging to the said constant-velocity joint. Each of the two forks 10 and 14 possesses a terminal crosspiece 10C, 14C, from which a spherical head 10B, 14B projects. Said two spherical heads are opposed to each other. The constant-velocity joint also includes a central core 16, consisting of two parts that are more or less symmetrical about a plane lying transversely relative to the general axis of the joint, when the input and output components of the members 9 and 12 are lined up with each other. Said two parts of the member 16 are joined to each other at 16s by welding, or by other means, such as bolts. The central core 16 has two opposing pairs of projections 16A1 the projections of each pair forming seats in which a respective spider 18 can rotate. Each spider 18 is further pivoted to the corresponding fork 10, 14, respectively, described above. The arrangement described above gives a typical constant-velocity joint, which is further completed by a constraint member 20 of discoidal shape having a central circular cylindrical through seat 20A, in which the opposing spherical heads 10B, 14B of the two forks 10 and 14 are received. The discoidal constraint member 20 is housed in such a way that it can slide inside a discoidal housing 24, which is formed by two parallel opposing walls 24A, 24B formed by the two components of the central core 16. These two components are suitably machined and welded at 16s or otherwise joined together to imprison the discoidal constraint member 20, 20B in such a way as to allow it to move about. The central core 16 is fitted with a grease nipple 28, which reaches the discoidal housing 24 via the discoidal constraint member 20. This member 20 has at least one radial hole 30 for communication between the housing 24 and the through seat 20A. This enables lubrication of the sliding surfaces 24A, 24B and the discoidal constraint member 20, and between the through seat 20A and the spherical heads 10B, 14B.

Figure 2:
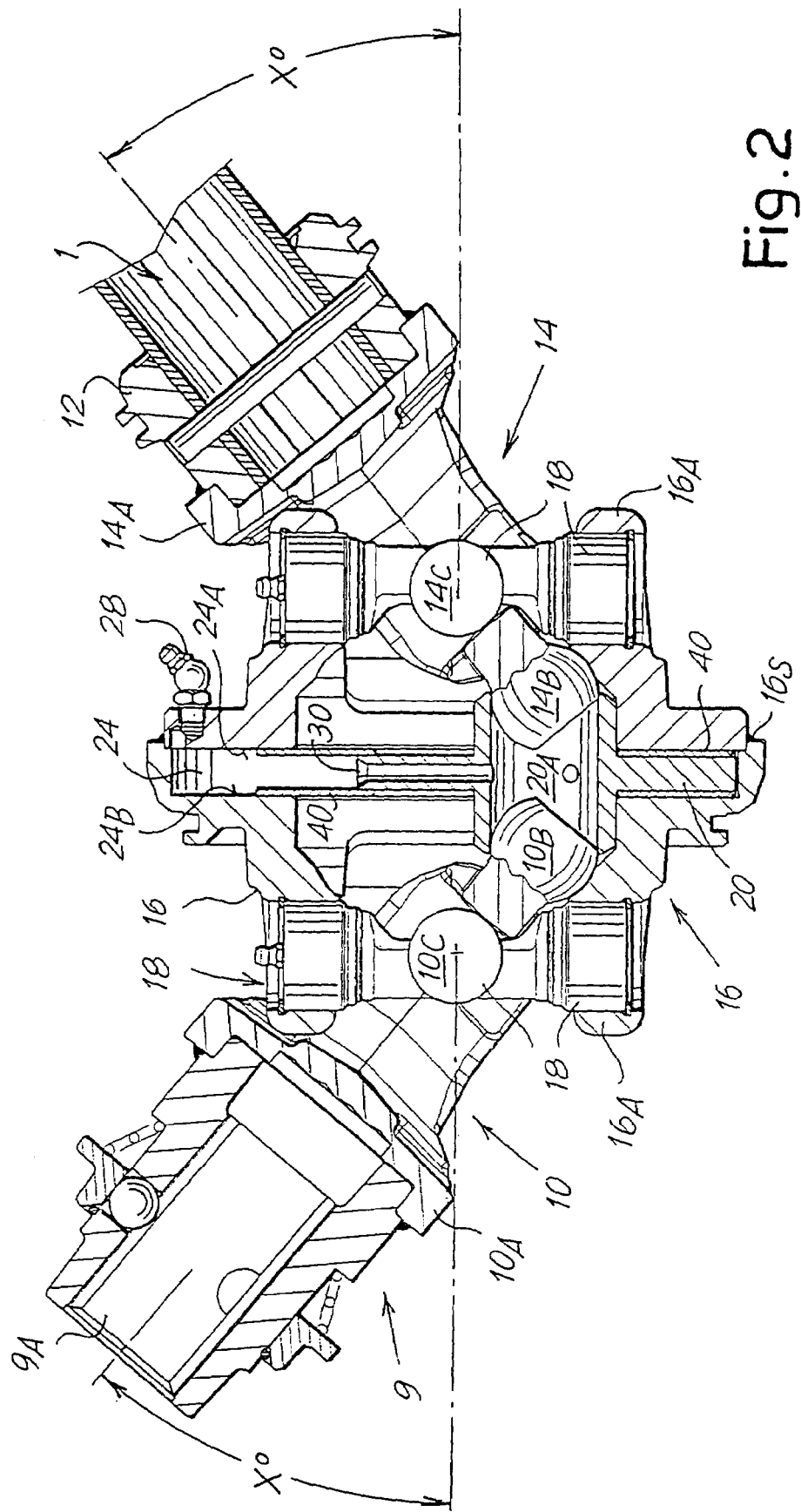

The above description was of an example of a shaft with a known type of constant-velocity joint, of the kind capable of transmitting drive even through a large angle, such as the angle X° as shown in FIG. 2, the purpose of which is well known. There are frequently two laminar rings 40 which are flat and are interposed between the surfaces 24A and 24B and the two faces of the discoidal constraint member 20, to reduce the loss of lubricating grease from the discoidal housing 24 to the exterior, whereas efficient lubrication is required between the spherical heads 10B and 14B and the seat 20A for these.

In the conventional versions, the efficiency against the leakage of lubricating grease obtained with these flat laminar rings is limited, which therefore requires frequent supply of grease from the grease nipple in order to ensure a sufficient lubrication between the cylindrical inside surface of the through seat 20A and the spherical heads 10B and 14B, so that the joint does not rapidly become unusable.

Figure 3:
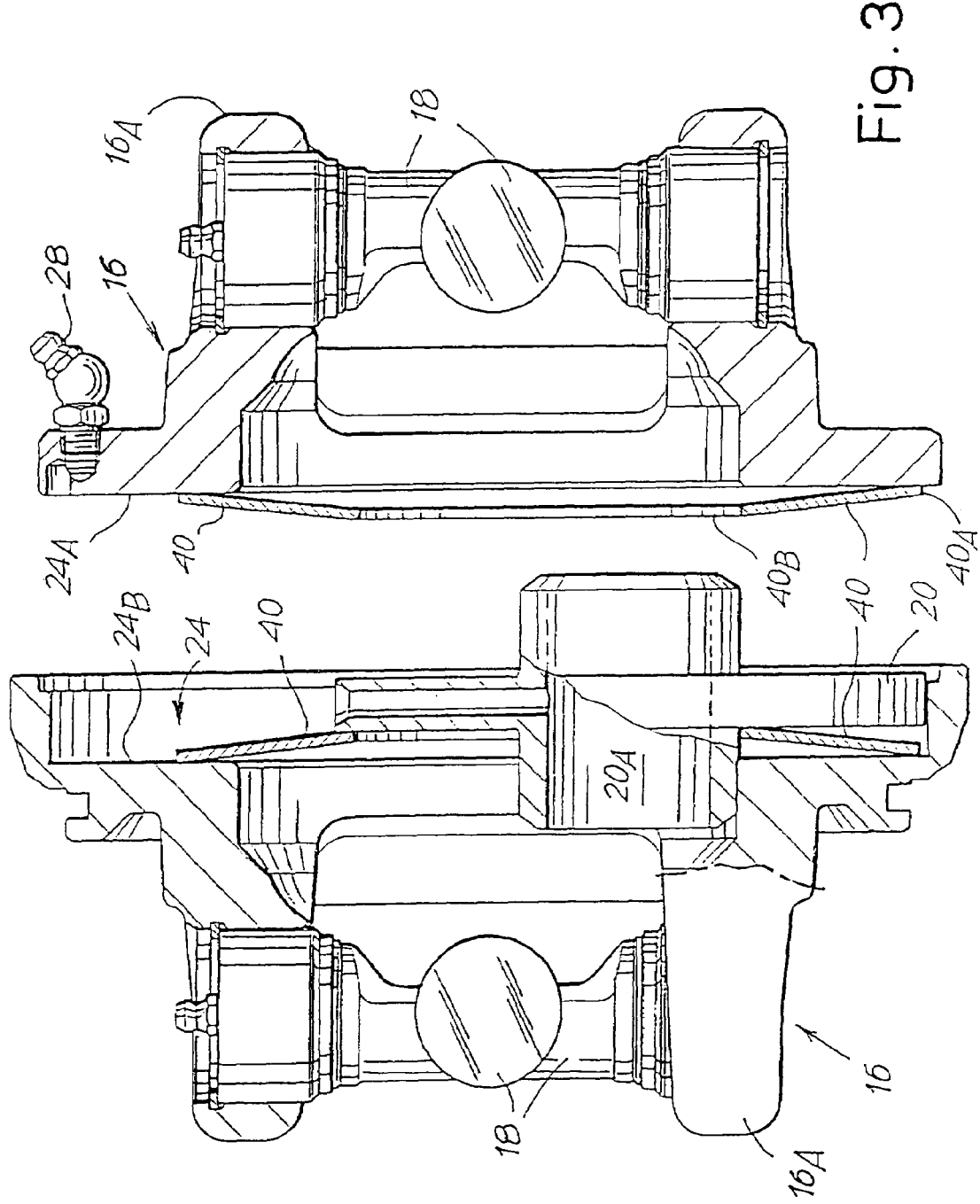
FIG. 3 shows certain components of the said joint in an exploded view.
Figure 4:
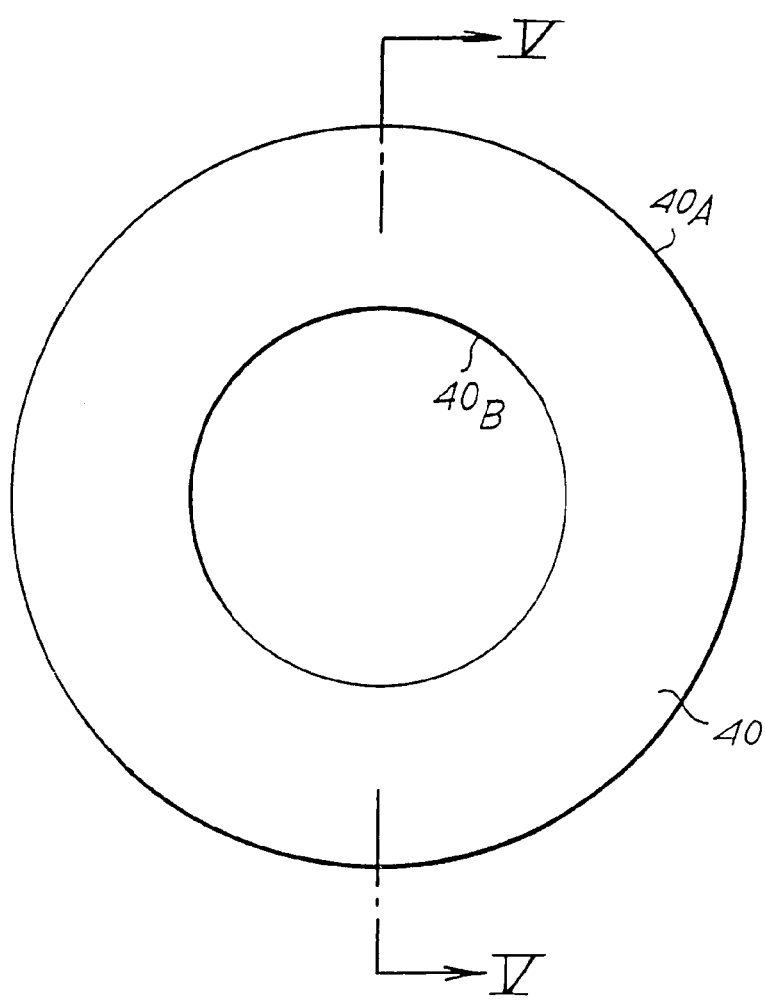
FIGS. 4 and 5 show in isolation one of two laminar sealing rings according to the invention, in end view and in section taken on V—V as marked in FIG. 4.
Figure 5:
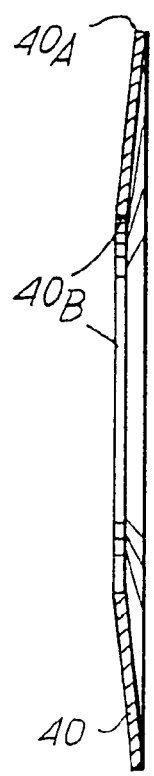

According to the invention, and as is clear in FIGS. 3 and 5, the laminar rings 40 (of FIGS. 1 to 5) are used in the form of Belleville washers (diaphragm springs) made of an elastic material, particularly a spring metal.

As can be seen in FIG. 3, when the two laminar rings 40 are inserted between each of the faces of the discoidal constraint member 20 and the surfaces 24A and 24B, before connecting the two parts of the central core 16 by welding them at 16S, the two rings 40 are more or less compressed and deformed axially, causing the internal edges 40B to press with continuity against the corresponding face of the member 20 and the outer edges 40A to press with continuity against the respective surfaces 24A and 24B. The effect is to sharply reduce the loss of lubricant between said surfaces 24A, 24B and the faces of the discoidal member 20, and the lubrication is sustained for a very long period between the spherical heads 10B, 14B and the seat 20A, obviating the need for frequent injections of grease from the grease nipple 28. Besides keeping the constant-velocity joint running, it also consumes less lubricant and greatly reduces the environmental pollution which would occur with leaking lubricant.

In an alternative embodiment, it is possible to have only one laminar ring 40 shaped as a Belleville washer and the other flat and stressed—by the same Belleville washer ring 40—to press against the surface of the core and against the face of the constraint member 20. This is functional enough for the purposes of lubrication and joint life.

It will be understood that the drawing shows only an example provided purely as a practical demonstration of the invention, which latter may be varied in its shapes and arrangements without thereby departing from the scope of the concept on which the invention is based. The presence of any reference numbers in the appended claims is for the purpose of facilitating the reading of the claims with reference to the description and drawing, and does not limit the scope of protection represented by the claims.

While specific embodiments of the invention have been shown and described in detail to illustrate the application of the principles of the invention, it will be understood that the invention may be embodied otherwise without departing from such principles.

What I claim is:

1. A wide-angle constant-velocity joint comprising:
   two forks forming input and output members of the joint, the forks having respective spherical end heads;
   two spiders;
   a central core forming a housing;
   one basically discoidal constraint member forming seats for the spherical end heads of said two forks, said housing receiving said constraint member for sliding movement in a transverse plane of symmetry of the central core, said constraint member moving when in use in the transverse plane, said housing having two surfaces disposed parallel to the transverse plane;
   a laminar ring interposed between one of said two surfaces and an opposing face of said constraint member resulting in continuous annular contact with said one of said two surfaces; and
   another laminar ring interposed between another one of said two surfaces and another opposing face of said constraint member resulting in continuous annular contact with said another one of said two surfaces and with said opposing face of the constraint member, wherein at least one of said laminar ring and said another laminar ring is formed of an elastic material and is shaped as a Belleville washer which bears via an outer edge on one of said two surfaces and via an inner edge against the opposing face of said constraint member.

2. A constant-velocity joint according to claim 1, wherein both of said laminar rings are of an elastic material and shaped as Belleville washers.

3. A wide-angle constant-velocity joint comprising:
   a first fork forming an input or output member of the joint, said first fork having a first fork spherical end head;
   a second fork forming an input or output member of the joint, said second fork having a second fork spherical end head;
   a central core forming a housing;
   a first spider pivotally connected to said first fork and to said housing;
   a second spider pivotally connected to said first fork and to said housing;
   a discoidal constraint member having a first seat receiving said first fork spherical end head and having a second seat receiving said second fork spherical end head, said housing supporting said constraint member for sliding movement in a transverse plane of symmetry of the central core, said constraint member moving when in use in the transverse plane, said housing having a first surface and a second surface disposed parallel to the transverse plane;
   a first laminar ring interposed between said first surface and an opposing first face of said constraint member resulting in continuous annular contact with said first surface; and
   a second laminar ring interposed between said second surface and an opposing second face of said constraint member resulting in continuous annular contact with said second surface and with said opposing second face of the constraint member, wherein said first laminar ring is formed of an elastic material shaped as a diaphragm spring washer having an outer edge bearing against said first surface and having an inner edge bearing against said opposing first face of said constraint member to form a sealing barrier to retain lubricant in said housing and restrict lubricant from passing from said housing beyond said first surface.

4. A wide-angle constant-velocity joint comprising:
   a first fork forming an input or output member of the joint, said first fork having a first fork spherical end head;
   a second fork forming an input or output member of the joint, said second fork having a second fork spherical end head;
   a central core forming a housing;
   a first spider pivotally connected to said first fork and to said housing;
   a second spider pivotally connected to said first fork and to said housing;
   a discoidal constraint member having a first seat receiving said first fork spherical end head and having a second seat receiving said second fork spherical end head, said housing supporting said constraint member for sliding movement in a transverse plane of symmetry of the central core, said constraint member moving when in use in the transverse plane, said housing having a first surface and a second surface disposed parallel to the transverse plane;

a first laminar ring interposed between said first surface and an opposing first face of said constraint member resulting in continuous annular contact with said first surface, said first laminar ring having an opening through which said first seat extends, said first laminar ring being floatingly mounted in said housing to move within said housing upon movement of said first seat; and a second laminar ring interposed between said second surface and an opposing second face of said constraint member resulting in continuous annular contact with said second surface and with said opposing second face of the constraint member, said second laminar ring being floatingly mounted in said housing to move within said housing upon movement of said second seat, wherein said first laminar ring is formed of an elastic material shaped as a diaphragm spring washer having an outer edge constantly bearing against said first surface during movement of said first laminar ring and having an inner edge constantly bearing against said opposing first face of said constraint member during movement of said first laminar ring to form a sealing barrier to retain lubricant in said housing and restrict lubricant from passing from said housing beyond said first surface.

5. A constant-velocity joint according to claim 4, wherein said second laminar ring is formed of an elastic material shaped as a diaphragm spring washer having an outer edge constantly bearing against said second surface during movement of said second laminar ring and having an inner edge constantly bearing against said opposing second face of said constraint member during movement of said second laminar ring to form a sealing barrier to retain lubricant in said housing and restrict lubricant from passing from said housing beyond said second surface.

* * * * *